United States Patent [19]

Yoshizaki

[11] Patent Number: 5,306,317
[45] Date of Patent: Apr. 26, 1994

[54] DEVICE AND METHOD FOR PRESERVING PUTTING GREEN ON A GOLF COURSE

[75] Inventor: Mitsuo Yoshizaki, Higashimatsuyama, Japan

[73] Assignees: Ryokuei-Kensetsu Co., Ltd.; Yoshizaki-Gijutsukenkyusho, both of Saitama, Japan

[21] Appl. No.: 869,512

[22] Filed: Apr. 16, 1992

[30] Foreign Application Priority Data

Jun. 26, 1991 [JP] Japan .................. 3-048568[U]

[51] Int. Cl.⁵ .............................................. A01B 79/00
[52] U.S. Cl. .................................... 47/1.01; 47/58
[58] Field of Search ............... 47/1.01, 58.09, 58.16, 47/58.25, 58.27

[56] References Cited

U.S. PATENT DOCUMENTS

| | | | |
|---|---|---|---|
| 1,904,001 | 4/1933 | Kimmel | 47/131 |
| 1,967,803 | 7/1934 | Boland | 47/131 |
| 2,947,109 | 8/1960 | Davis | 47/1 F |
| 4,348,135 | 9/1982 | Clair | 405/131 |
| 4,437,263 | 3/1984 | Nir | 47/1 F |
| 4,462,184 | 7/1984 | Cunningham | 47/58.27 |
| 5,120,198 | 6/1992 | Husu | 405/131 |

Primary Examiner—Henry E. Raduazo
Attorney, Agent, or Firm—Wenderoth, Lind & Ponack

[57] ABSTRACT

By circulating fluid heated by a boiler through a radiation pipe laid under the putting green of a golf course, the putting green is continuously, and warmed. In accordance with the difference between the temperatures on the outlet side and inlet side of the boiler, the temperature to which the fluid is heated is controlled, thereby maintaining an putting green at the optimum temperature for raising the lawn grass planted on the putting green.

5 Claims, 4 Drawing Sheets

DEVICE AND METHOD FOR PRESERVING PUTTING GREEN ON A GOLF COURSE

BACKGROUND OF THE INVENTION

1. Field of the Invention

This invention relates to a device and a method for the preservation of lawn grass on a putting green of a golf course or other plants. More particularly, this invention relates to a green preserving device capable of maintaining the putting green at an optimum temperature for raising plants by circulating heated fluid through an underground pipe laid under the putting green.

2. Description of the Prior Art

There has been conventionally proposed a green heat-up system in which the terrestrial temperature is raised to force the growth of the lawn grass on the putting green in Japanese Utility Model Application Public Disclosure No. SHO 62-102342(A). This prior art system is composed by laying a spiral or zigzag-form pipe under the putting green so as to flow water or air warmed by geothermal heat through the underground pipe.

However, such a heat-up system utilizing geothermal heat has not generally been used to increase the terrestrial temperature. This is because the heat is too low to sufficiently warm the entire area of the putting green for growing the lawn grass. The conventional heat-up system is therefore restricted in the area in which it can be used.

The inventor of the present invention has already proposed a method for heating the putting green of a golf course in which a fluid heated by a boiler is circulated through a supply pipe, a heat radiation pipe laid under the putting green and a return pipe so that the heat of heated fluid is radiated from the radiation pipe to warm the putting green. (Japanese Pat. Appln. Pub. Discl. No. HEI 62-210929(A)).

Though the proposed method can a sufficient heat energy, it however entails a disadvantage in that air is easily produced in the heat radiation pipe when the heat of the heated fluid flowing through the radiation pipe is radiated. The air thus produced causes the so-called air hammer phenomenon, and leads to a problem of bringing about a sudden change of temperature in the radiation pipe. The air hammer phenomenon appears in not only the radiation pipe, but in the return pipe, and is apt to administer impulses, particularly to a joint portion between a large pipe and a small pipe, consequently causing the leakage of fluid or the bursting of the pipe. Thus, the system based on the proposed method has a problem in durability.

Furthermore, since the maintenance of the system for practicing the proposed method costs a great deal, the system is not commercially practicable. Besides, the air hammer phenomenon, which brings about a sudden change in temperature exerts a baneful influence upon the growth of the lawn grass on the putting green.

OBJECT OF THE INVENTION

The present invention was made to eliminate the various drawbacks suffered by the conventional devices of this type and to provide a device and method capable of maintaining, for example, the putting green of a golf course at the optimum temperature for preserving the lawn grass planted on the putting green by circulating heated fluid through a radiation pipe laid under the putting green, and particularly, maintaining suitably the condition of the putting green during the winter months or in a cold district.

Another object of the present invention is to prevent the occurrence of the air hammer phenomenon in a radiation pipe for the circulation of heated fluid, which might probably cause the pipe arrangement under the putting green to be damaged and gives rise to ill effect effects on the lawn grass on the putting green.

Still another object of the present invention is to provide a device capable of collecting ground water or rainwater warmed by the heated fluid, thereby gaining excellent thermal and economical efficiencies and preventing environmental pollution by agricultural chemicals.

SUMMARY OF THE INVENTION

To accomplish the objects described above according to the present invention, there is provided a device for the preservation of lawn grass on a putting green of a golf course, which comprises a radiation pipe laid under the putting green, a leading pipe unit having a supply pipe and a return pipe which are connected with the radiation pipe. A fluid heating unit includes a discharge passage for sending fluid from a heating boiler to the radiation pipe through the supply pipe and a return passage for allowing the fluid sent to the radiation pipe to return to the boiler through the return pipe. In this device, the discharge and return passages each are provided with a thermometer so that the temperature to which the fluid to be supplied should be heated can be regulated according to the difference in the temperatures measured by the thermometers.

The method for preservation of lawn grass on the putting green according to this invention comprises supplying fluid heated by a boiler to a radiation pipe laid under the putting green through a discharge passage and a supply pipe, allowing the fluid supplied to the radiation pipe to return to the boiler through a return pipe and a return passage, and regulating the temperature to which the fluid is heated by the boiler according to the difference in the temperatures measured by thermometers mounted in the respective discharge and return passages.

The fluid heating unit and radiation pipe are provided with air vent valves for discharging air gathered in a path from the discharge passage to the return passage through the supply, radiation and return pipes.

While viewing the thermometer mounted in the discharge passage, the fluid is heated to the desired temperature and supplied to the radiation pipe laid under the putting green by use of a fluid pump. The heated fluid flowing through the radiation pipe serves to gradually warm the putting green. The fluid thus supplied to the radiation pipe returns to the boiler through the return passage. Viewing the thermometer mounted in the return passage, the difference in temperature between the fluid flowing out from the boiler and the fluid returning to the boiler is checked so that the temperature to which the fluid is heated is determined to maintain the putting green at the optimum temperature for raising plants, particularly optimizing the condition of the putting green in winter or in a cold district.

By disposing the air vent valves in the fluid heating unit and the radiation pipe, air produced in the circulation path can be removed, thereby improving the durability of the device and reducing the cost of maintaining of the device. The temperature of the putting green can easily be controlled by regulating the temperature at which the fluid is heated by the boiler and/or the supply amount of the heated fluid.

Other and further objects of this invention will become obvious upon an understanding of the illustrative embodiments about to be described, or will be indicated in the appended claims, and various advantages not referred to herein will occur to one skilled in the art upon employment of the invention in practice.

BRIEF DESCRIPTION OF THE DRAWINGS

Other objects and features of the present invention will be hereinafter explained in detail with reference to the accompanying drawings, wherein.

DESCRIPTION OF THE PREFERRED EMBODIMENTS

Figure 1:
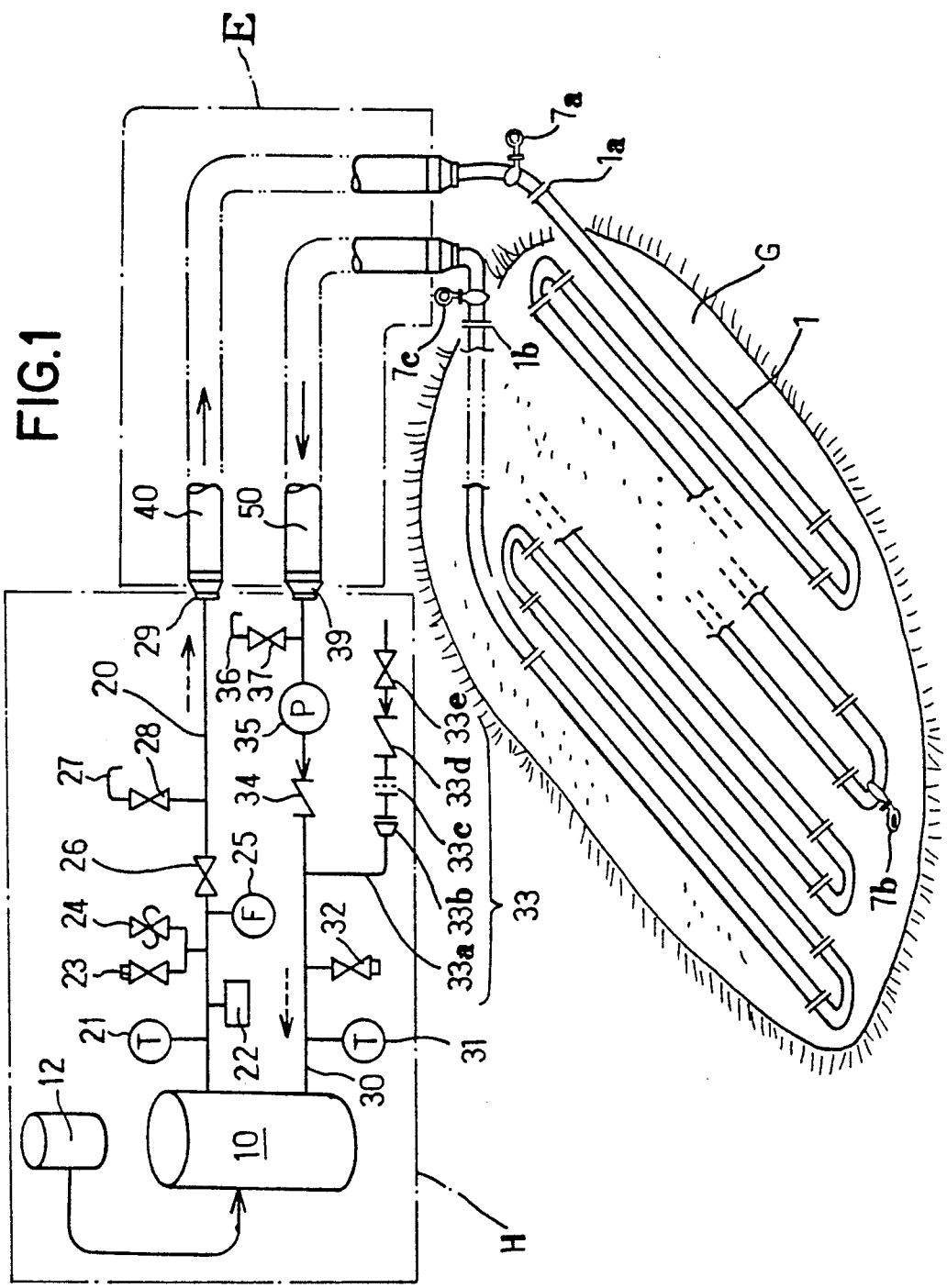
FIG. 1 is a schematic view showing one embodiment of a device according to this invention.
Figure 2:
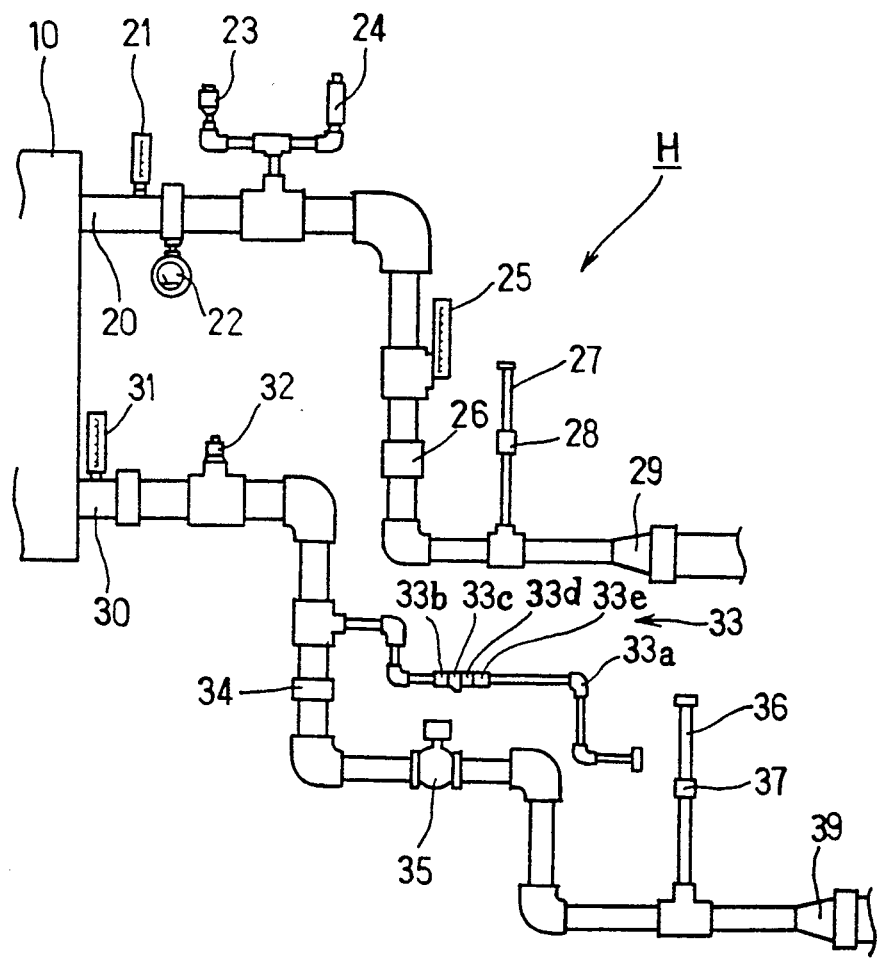
FIG. 2 is an explanatory diagram showing a pipe arrangement in a fluid heating unit of the device according to this invention.

The present invention will become more fully understood from the detailed description given hereinbelow and the accompanying drawings which are given by way of illustration only, and thus are not limitative of the present invention. This invention relates to a green preserving device capable of maintaining the putting green at the optimum temperature for raising plants. One preferred embodiment of this invention will be described with reference to FIG. 1. In the drawing, reference mark H denotes a fluid heating unit, E denotes a leading pipe unit, and G denotes a putting green portion under which a radiation pipe 1 is laid.

The fluid heating unit H includes a boiler 10 for heating fluid such as water, and a fuel tank 12 for supplying the boiler 10 with fuel. The boiler 10 is connected to a discharge passage 20 and a return passage 30. Between these passages 20 and 30, there is connected the radiation pipe 1 so as to circulate the fluid heated by the boiler 10.

The discharge passage 20 comprises a thermometer 21, a pressure gauge 22, an air vent valve 23, a relief valve 24, a fluid flow meter 25, a gate valve 26, and a drain pipe 27 with a gate valve 28.

The return passage 30 comprises a thermometer 31, an air vent valve 32, a fluid feeding means 33, a check valve 34, a constant flow pump 35 and a drain pipe 36 with a gate valve 37.

The fluid feeding means 33 serves to replenish the circulation system composed of the fluid heating unit H, leading pipe unit E and radiation pipe 1 with fluid when the fluid flowing through the system is lessened, and comprises a make-up feed pipe 33a, a pressure control valve 33b for regulating the pressure of fluid to be replenished, a strainer 33c for removing dust and the like, a check valve 33d and a gate valve 33e.

On the outlet end of the discharge passage 20 and the inlet end of the return passage 30, there are disposed joints 29 and 39 for connecting the leading pipe unit E, respectively. To be more specific, the leading pipe unit E comprises a supply pipe 40 having one end connected to the discharge passage 20 through the joint 29 and the other end connected to one end 1a of the radiation pipe 1, and a return pipe 50 having one end connected to the return passage 30 through the joint 39 and the other end connected to the other end 1b of the radiation pipe 1.

The supply pipe 40 of the leading pipe unit E has a diameter of, for example, about 40 to 150 mm, and preferably is made of material having corrosion resistivity and moderate flexibility, such as polyethylene, and covered with heat insulating material, such as foamed styrol, so as to lessen the thermal loss. It is further desirable to wind the outer surface of the supply pipe 40, covered with the heat insulating material, with an adhesive tape.

The return pipe 50 has substantially the same structure and configuration as the supply pipe 40 noted above.

Figure 3:
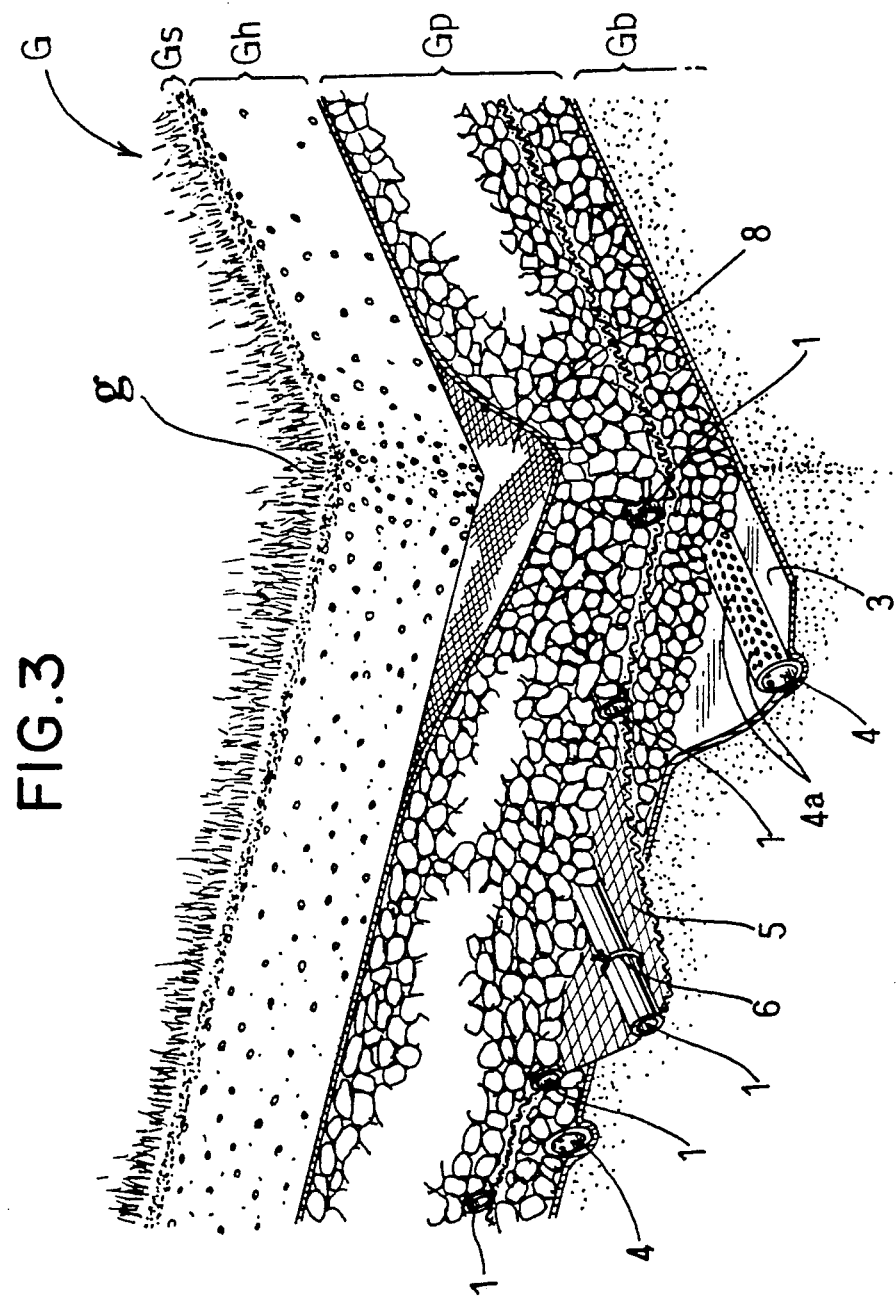
FIG. 3 is a partially sectioned perspective view showing a geologic formation under a putting green to which the device of this invention is applied.

The putting green portion G in this embodiment has a geologic formation with numerous small holes and hollows for allowing air and water to rise, thereby warming the whole ground surface of the putting green. As illustrated in FIG. 3, the putting green portion G is generally composed of a foundation base layer Gb, a permeable layer Gp, a porous layer Gh, and a surface soil layer Gs on which lawn grass g is planted.

The upper surface of the foundation base layer Gb has grooves and is covered with an impermeable sheet 3 having a thickness of about 1 mm and, preferably, heat insulating properties. On the sheet 3, drain pipes 4 are disposed, being fitted in the grooves formed in the upper surface of the foundation base layer Gb. The drain pipe 4 has a lot of holes 4a in the upper half thereof and a diameter of about 50 to 120 mm, for example. The permeable layer Gp may be composed of aggregates that have frequent hollows and excellent permeability, preferably, pumice stone or smashed rock being about 20 to 60 mm in diameter. To be concrete, the permeable layer Gp may be formed by spreading such aggregates all over the sheet 3.

In the permeable layer Gp, a wire gauze 5 is spread for stably retaining the radiation pipe 1. The radiation pipe 1 is fixedly fastened at places to the wire gauze 5 by the use of fastening means such as wires at intervals of about 20 to 30 cm, so that the stability of the radiation pipe 1 can be ensured during the course of prolonged service and easily handled in executing the laying work therefor.

When the radiation pipe 1 is made of a material having good heat conductivity, the putting green is susceptible to unevenness in temperature, since the portion near the radiation pipe 1 is well warmed. Therefore, it is desirable to make the radiation pipe 1 of a plastic material poor in heat conductivity. The radiation pipe 1 is further desired to be excellent in corrosion resistivity and flexible so that it can be freely laid under the putting green in the form of a spiral or zigzag. In conclusion, a plastic pipe such as of polyethylene or the like is suitable for the radiation pipe.

The radiation pipe 1 in the case shown in FIG. 1 is bent in a zigzag line, leaving 50 cm intervals between the adjacent linear parts of the zigzagged pipe. Though the intervals between the adjacent linear parts of the pipe may be decreased to uniformly warm the putting green, it is better to leave intervals of at least about 20 cm between the adjacent linear parts from the standpoint of cost.

Air vent valves 7a, 7b and 7c for releasing air produced in the radiation pipe 1 are disposed near the inlet portion, the middle portion and the outlet portion 1b of the radiation pipe 1 so that they can be handled from the ground surface.

In this embodiment, the permeable layer Gp has a total height of about 30 cm and the radiation pipe 1 is laid at a height of about 10 cm from the sheet 3.

The porous layer Gh is desired to have sufficient water permeability of over 3000 mm/hr, and therefore may be formed by depositing, on the permeable layer Gp, pumice stone, pudding stone (small stone) or the like having a diameter of 3 to 20 mm. Between the permeable layer Gp and the porous layer Gh, there may be spread a net 8 for preventing the permeable layer Gp and porous layer Gh from being intermixed. The net 8 may be made of synthetic resins with a 1 to 5 mm mesh.

The surface soil layer Gs is not specifically restricted, insofar as it is suitable for rearing the lawn grass on the putting green, but it is desirable to have a water permeability over 500 to 1000 mm/hr.

The putting green structure having the geologic formation described above enjoys a high permeability to uniformly transmit the heat radiated from the radiation pipe 1 to the ground surface on which the lawn grass g is planted. As a result, the lawn grass g can be well raised even in the winter or in a cold district.

Rainwater or water sprinkled over the putting green permeates the porous layer Gh through the soil layer Gs and flows into the drain pipe 4 through the permeable layer Gp. The water flowing into the drain pipe 4 is gathered so as to be supplied to the fluid heating unit H as needed.

It was clear from the results of the experiments conducted by the inventor that the device for preservation of lawn grass according to present invention makes it possible to raise the lawn grass under the most favorable conditions.

One experiment was carried out by using a leading pipe unit having a length of 200 m in an environment of 2° C. to 5° C. in the midst of winter. In this experiment, the fluid discharged from the boiler 10 was controlled in temperature to be about 55° C. and circulated continuously around the circulation path, including the radiation pipe 1 laid under the putting green portion G having an area of 750 m². Consequently, the temperature around the radiation pipe 1 in the permeable layer Gp was increased to 44° C. to 46° C., the permeable layer Gp on the whole was warmed to 34° C. to 36° C. on the average, the porous layer Gh on the whole was warmed to 20° C. to 22° C. on the average, and the upper portion of the porous layer Gh near the surface soil layer Gs could be maintained at 16° C. to 18° C. on the average. Under such temperature conditions, the lawn grass can be well raised, thereby enabling the conservation and maintenance of suitable green condition even in winter.

In another experiment, the air hammer phenomenon was found by observing the pressure gauge 22, resulting in a decrease in temperature in the green portion G. Then, by operating the air vent valves 23, 32, 7a, 7b and 7c, the air hammer phenomenon disappeared promptly, and the temperature of the green portion G was recovered.

Prior to the operation of the device, the pipe system must be first filled with heating fluid. As one measure, the heating fluid is introduced into the pipe system in the state of closing the gate valve 28 of the drain pipe 27 and the gate valve 37 of the drain pipe 36 and opening the air vent valves 23 and 32, gate valve 26 and the gate valve 33e of the pipe 33a, while operating the pump 35 and letting air out of the pipe system. At that time, checking the fluid flow meter 25, the gate valve 26 is operated to stably flow the fluid at a rate of about 110 to 180 lit./min. Upon releasing the air in the pipe system, the boiler 10 is worked so as to heat the fluid within the range of 46° C. to 70° C. at the discharge passage 20 and keep the temperature in the soil layer Gs at 13° C. to 20° C. at all times, taking the environmental temperature and geothermal temperature into consideration.

Also, in accordance with the difference between the temperatures measured by the thermometers 21 and 31, the fluid is heated to keep the temperature of the green portion G constant. The flow amount of the fluid may be controlled by operating the gate valve 26 while viewing the flow meter 25 to keep the temperature constant.

In a case of excessively increasing the temperature of the heated fluid, the boiler 10 is automatically stopped. When the pressure in the discharge passage 20 increases abnormally, the relief valve 24 is automatically actuated to release the inner pressure outside. By confirming the pressure gauge 22, the state of the air staying in the discharge passage 20 and leakage of the fluid can be recognized. By opening the gate valves 28 and 37, fur or precipitate in the heating fluid can be removed from the passages 20 and 30 through the drain pipes 27 and 36. When the fluid in the pipe system runs low, supplemental fluid is supplied through the make-up feed pipe 33a.

In the foregoing preferred embodiment, the pump 35 is mounted in the return passage 30. Instead, it may be disposed in the discharge passage 20.

Also in the foregoing embodiment, the radiation pipe 1 is arranged in a zigzag pattern so as to flow the heated fluid from one edge to the opposite edge of the green portion G. Therefore, the temperature near the inlet portion 1a of the radiation pipe 1 is somewhat higher than that near the outlet portion 1b of the same.

Figure 4:
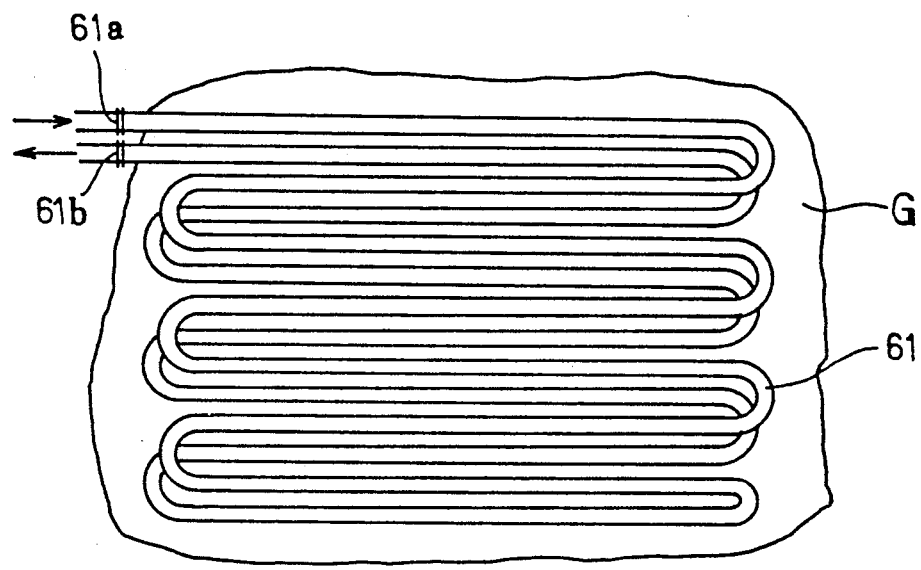
FIG. 4 is a plan view schematically showing a radiation pipe in another embodiment of this invention.

To eliminate the drawback noted above, the pipe arrangement shown in FIG. 4 may be employed. In this embodiment, a radiation pipe 61 has an inlet portion 61a and an outlet portion 61b both located around one edge of the green portion G and a turning part thereof located around the opposite edge of the green portion. This pipe arrangement provides a uniform concentration of the temperature of to the warmed green portion.

Figure 5:
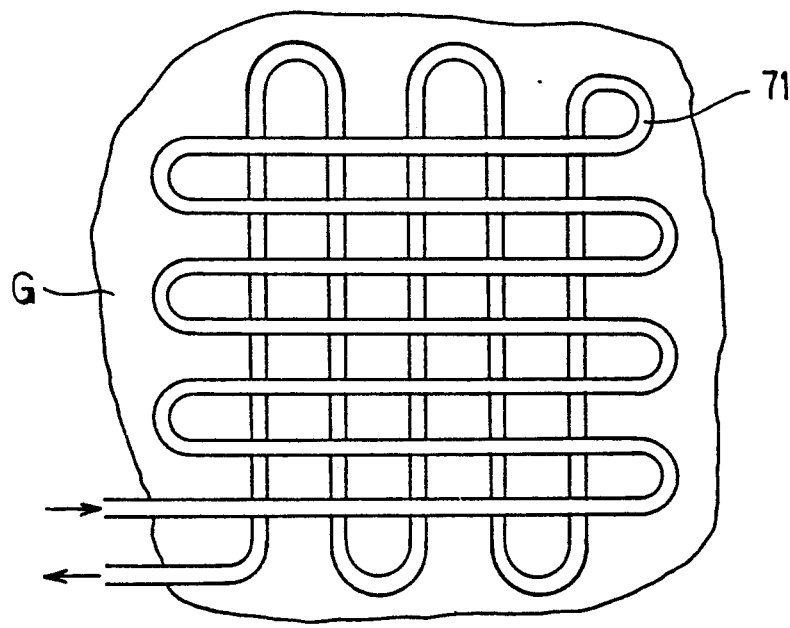
FIG. 5 is a plan view schematically showing the radiation pipe in still another embodiment of this invention.

There may also be used a radiation pipe 71 having a grid-like pipe arrangement as shown in FIG. 5, in which the high temperature linear parts and low temperature linear parts intersected. Even with this pipe arrangement, the temperature of the green portion can be kept constant.

Thus, the pipe arrangement can be designed in various ways and therefore should be understood as non-limitative.

As is readily understood from the ab according to the device and method of this invention, the putting green of a golf course can be continuously maintained at the optimum temperature for preserving the lawn grass planted on the putting green by circulating the heated fluid through the radiation pipe laid under the putting green. Particularly, the condition of the putting green can be maintained suitably even in the winter or in a cold district. The air hammer phenomenon can be prevented from occurring in a radiation pipe for the circulation of a heated fluid. The ground water or rainwater warmed by the heated fluid can be easily collected, thereby gained excellent thermal and economical efficiencies and preventing environmental pollution by agricultural chemicals.

Although the invention has been described in its preferred form with a certain degree of particularity, it is understood that the present disclosure of the preferred form may be changed in the details of its construction, and a recombination and rearrangement of parts may be resorted to without departing from the spirit and the scope of the invention as hereinafter claimed.

What is claimed is:

1. A device for preserving grass on a putting green of a golf course, comprising:

a radiation pipe laid under the putting green;

a leading pipe unit, said leading pipe unit having a supply pipe connected with said radiation pipe and a return pipe connected with said radiation pipe; and a fluid heating unit, said fluid heating unit comprising a heating boiler, a discharge passage connected to said supply pipe and said heating boiler for sending fluid from said heating boiler to said radiation pipe through said supply pipe, and a return passage connected to said discharge pipe and said heating boiler for allowing fluid sent to said radiation pipe to return to said heating boiler through said return pipe;

wherein said discharge and return passages are each provided with a thermometer for regulating the temperature to which the fluid is heated according to the difference between the temperatures measured by said thermometers; and wherein said discharge passage is further provided with a pressure gauge, an air vent valve, a relief valve, a fluid flow meter, a gate valve and a drain pipe extending therefrom, said drain pipe having a second gate valve.

2. The device of claim 1, wherein said radiation pipe has a plurality of air vent valves therein for releasing air from said radiation pipe.

3. A device for preserving grass on a putting green of a golf course, comprising:

a radiation pipe laid under the putting green;

a leading pipe unit, said leading pipe unit having a supply pipe connected with said radiation pipe and a return pipe connected with said radiation pipe; and a fluid heating unit, said fluid heating unit comprising a heating boiler, a discharge passage connected to said supply pipe and said heating boiler for sending fluid from said heating boiler to said radiation pipe through said supply pipe, and a return passage connected to said discharge pipe and said heating boiler for allowing fluid sent to said radiation pipe to return to said heating boiler through said return pipe;

wherein said discharge and return passages are each provided with a thermometer for regulating the temperature to which the fluid is heated according to the difference between the temperatures measured by said thermometers; and wherein said return passage is further provided with an air vent valve, a fluid feeding means for feeding replenishing fluid to said return passage, a check valve, a constant flow pump and a drain pipe, said drain pipe having a gate valve.

4. The device of claim 3, wherein said fluid feeding means comprises a make-up feed pipe connected to said return passage, a pressure control valve in said make-up feedpipe for regulating the pressure of the replenishing fluid, a strainer in said make-up feed pipe for removing dust, a check valve in said make-up feed pipe and a gate valve in said make-up feed pipe.

5. The device of claim 1, wherein said radiation pipe has a plurality of air vent valves therein for releasing air from said radiation pipe.

* * * * *